Aug. 23, 1955 W. H. FLARITY 2,716,215
PULSE WIDTH MEASURING PROCESS
Filed May 15, 1946 3 Sheets-Sheet 1
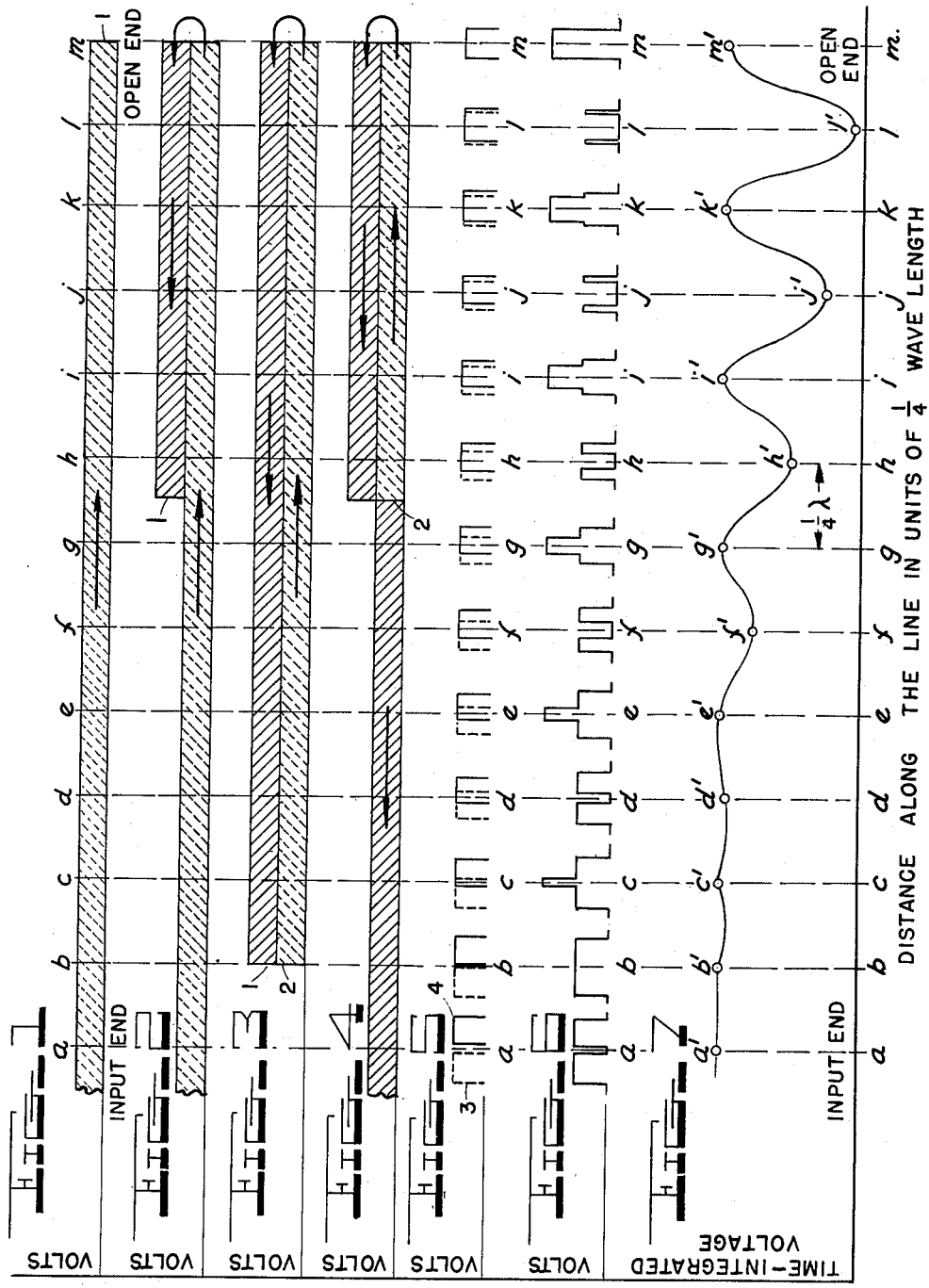
INVENTOR.
WARREN H. FLARITY
BY M. O. Hayes
ATTORNEY Aug. 23, 1955     W. H. FLARITY     2,716,215
PULSE WIDTH MEASURING PROCESS
Filed May 15, 1946     3 Sheets-Sheet 2

INVENTOR.
WARREN H. FLARITY
BY M. A. Hayes
ATTORNEY

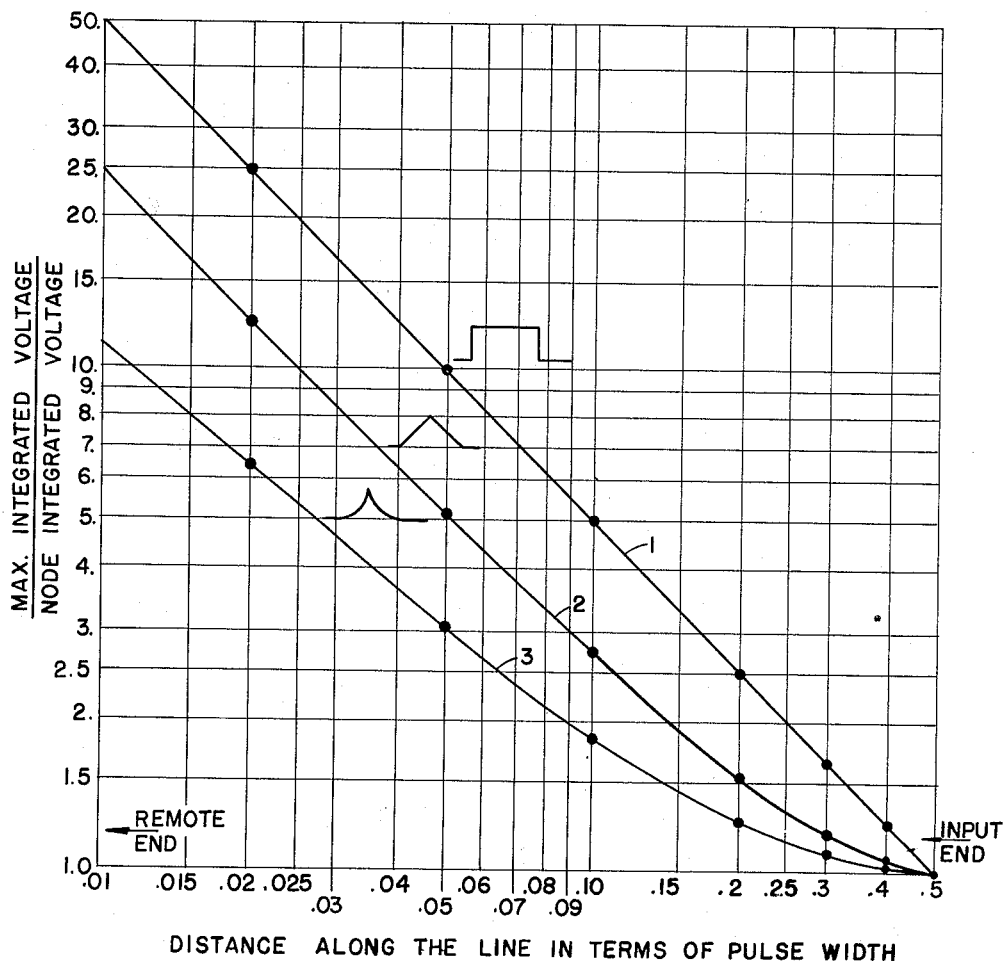

United States Patent Office 2,716,215
Patented Aug. 23, 1955

2,716,215

PULSE WIDTH MEASURING PROCESS

Warren H. Flarity, Arlington, Va.

Application May 15, 1946, Serial No. 669,768

5 Claims. (Cl. 324—68)

(Granted under Title 35, U. S. Code (1952), sec. 266)

This invention relates to a process of measuring the width of radio-frequency pulses of short duration.

Conventional methods of measuring the width of pulses are not adequate for measuring pulses of very short duration in the order of about one-quarter microsecond and less. The process of measurement embodied in this invention involves feeding the pulse to be measured into a line having its remote end terminated so as to reflect the pulse back to the source. The interference in the line between the part of the pulse going into the line and the part returning from the reflecting end is relied upon in connection with the speed of transmission of energy in the line to determine the width of the pulse.

An object of this invention is a process by which the width in time duration of the envelope of a narrow radio-frequency pulse may be determined.

Another object of this invention is a process by which the width of the envelope of a narrow radio-frequency pulse, in terms of length in physical units, may be determined.

A further object of this invention is a process by which the shape of the envelope of a narrow radio-frequency pulse may be determined.

Other further objects of this invention will be apparent to those skilled in the art from the specification and claims.

Referring briefly to the figures:

Fig. 1 is a representation of the envelope of the alternating-current voltage along the line into which a square pulse to be measured is fed, at the instant when the leading edge of the pulse has just reached the remote reflecting end of the line.

Fig. 2 is a representation of the envelope of the A.-C. voltage along the line at the instant when the leading edge of the pulse has been reflected and is about halfway back to the input end of the line.

Fig. 3 is a representation of the envelope of the A.-C. voltage along the line at the instant when the leading edge of the pulse in going out of the line coincides in position with the trailing edge of the pulse in going into the line.

Fig. 4 is a representation of the envelope of the A.-C. voltage along the line at the instant when the trailing edge of the pulse is about half-way into the line.

Fig. 5 is a series of voltage-time plots of the envelopes of the A.-C. voltages due to the pulse when going into the line and when reflected back out of the line at points $a$ through $m$ on the line.

Fig. 6 is a series of voltage-time plots of the algebraically-combined envelopes of the A.-C. voltages due to the pulse when going into the line and when reflected back out of the line at points $a$ through $m$ on the line. The combined envelopes are the result of addition of the non-overlapping parts and addition or subtraction of the overlapping parts depending on the relative phase of the A.-C. voltages therein. The area under a combined envelope corresponding to a point on the line is referred to as the time-integrated A.-C. voltage at that point.

Fig. 7 is a representation of the values of time-integrated A.-C. voltage at all points along the line into which the pulse is fed.

Figure 8:
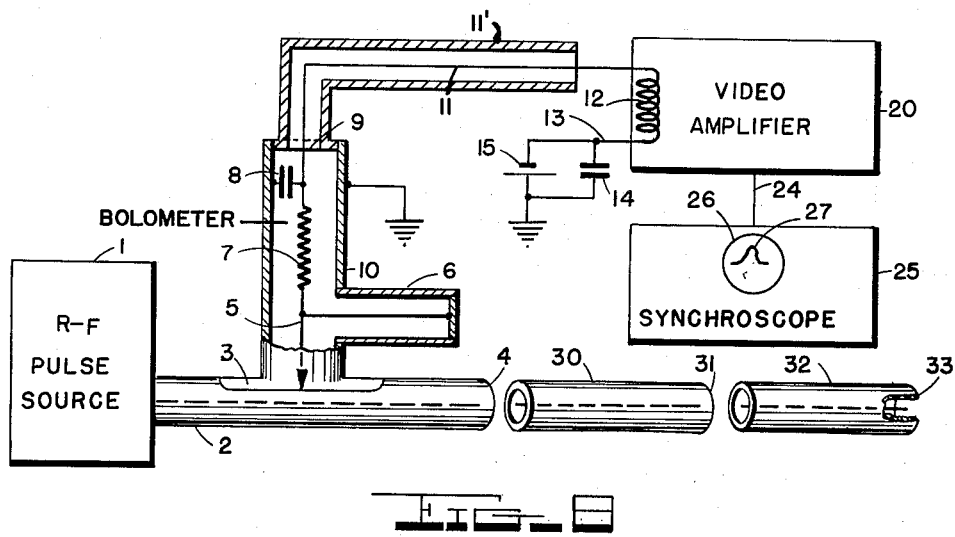

Fig. 8 is a diagrammatic representation of apparatus used for determining pulse width, or pulse duration.

Figure 9:
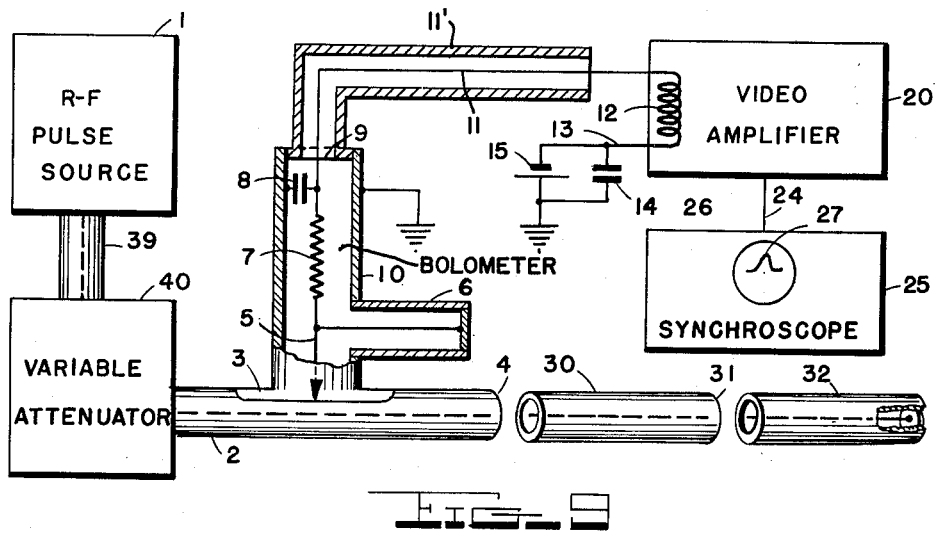

Fig. 9 is a diagrammatic representation of apparatus used for determining approximate pulse shape.

Fig. 10 is a comparison chart used in determining approximate pulse shape.

Now referring more specifically to Figs. 1 through 7, for an explanation of the theory underlying the invention:

Figs. 1 through 7 apply to a square pulse. It is to be understood that the width of pulses of other shapes can be measured in the same way. It is also to be understood that the total length of the line into which the pulse is fed is at least one-half as long as the pulse is wide. As used herein, the expression "pulse width" is used to indicate width or length of the pulse in physical distance. The expression "pulse duration" indicates the width of the pulse in terms of the time required for the pulse to pass a given point in the line. In common usage in the art, the expressions "pulse width," "pulse length" and "pulse duration" are often used synonymously, although the units of measure are different.

Fig. 1 is a representation of the alternating-current voltage along the line into which the square pulse to be measured is fed at the instant when the leading edge 1 of the pulse has just reached the remote reflecting end $m$ of the line. Merely the envelope of the pulse is shown in Figs. 1 through 4 but the pulse actually consists of radio-frequency alternating energy.

Fig. 2 is a representation of conditions a short time later than Fig. 1. The leading edge 1 of the pulse has been reflected from the open-circuited end $m$ and returned half-way back down the line.

Fig. 3 is a representation of conditions a short time later than Fig. 2. The leading edge 1 of the pulse in leaving the line coincides in position with the trailing edge 2 of the pulse entering the line.

Fig. 4 is a representation of conditions of a still later time when the trailing edge 2 of the pulse is half-way into the line and the leading edge is completely out of the line (and out of the figure). The trailing edge then continues to the open-circuited end and is reflected back and out of the line.

Fig. 5 is derived from Figs. 1 through 4 by considering the voltage at points $a$ through $m$ on the line as a single pulse moves down and back along the line. Each of the charts $a$ through $m$ of Fig. 5 is a voltage vs. time curve of the voltage at points $a$ through $m$ on the line due to the pulse on its way past the points on its way into the line and the voltage due to the pulse on its way out of the line. At point $a$, the voltage 3 rises to the value of the pulse during the time the pulse moves past point $a$ into the line and then falls to zero for a very short time. Then the voltage 4 rises to the value of the pulse during the time the pulse moves past point $a$ on the way out of the line. A time-voltage integrating probe at point $a$ would therefore indicate a time-integrated voltage equal to twice the time-integrated voltage of the pulse.

Time integrated voltage at a point on the line, as used herein, means the summation of the product of the instantaneous voltage observed at the point on the line and the time increments from the time the leading edge of a single pulse moves past the point on its way into the line to the time the trailing edge of the pulse moves past the point on its way out of the line. The expression "time-integrated voltage" as used herein is, of course, synonymous with "energy" because energy is time-integrated power and because the measurements at one point on the line are compared with measurements on other points on the line. The relative values of time-integrated voltage or energy at various points on the line are important for the purpose of this invention, but the absolute values are unimportant.

In order to get persistence of indication, pulses may be fed into the line at any desired repetition rate, such as, for example, a rate between 60 and 1000 pulses per second.

At point $b$, the reflected leading edge of the pulse goes past point $b$ at the moment that the trailing edge moves past point $b$ on its way into the line. The voltage at point $b$ is never twice the voltage of the pulse. The voltage at point $b$ is therefore equal to the pulse voltage for a time equal to twice the width of the pulse. The voltages at point $c$, however, from the part of the pulse going into the line and the part of the pulse going out of the line momentarily overlap in time. At points $d$ through $l$, inclusive, the amount of overlap progressively increases. At point $m$, the open-circuited end of the line, the voltages overlap 100 per cent because during the time the ingoing part of the pulse is at point $m$, the outgoing reflected part of the pulse is also at point $m$.

The total voltage during the time the incoming and outgoing parts of the pulse overlap is the algebraic sum of the parts. Since the pulse is composed of radio-frequency alternating-current voltage and since the A.-C. voltage of the incoming part of the pulse varies progressively from in phase to 180 degrees out of phase with the outgoing part of the pulse along the line, the algebraic addition varies from arithmetic addition to cancellation at various points along the line.

Fig. 6 is derived from Fig. 5 and shows the algebraic addition of the incoming and outgoing parts of the pulse at points $a$ through $m$, inclusive, along the line. At points, $a$, $c$, $e$, $g$, $i$, $k$ and $m$ the A.-C. voltage of the incoming part of the pulse is in phase with the A.-C. voltage of the outgoing part of the pulse, because these points are an even number of quarter wavelengths from the open-circuited end. Therefore, at these points the voltages are added arithmetically where they overlap.

But at points $b$, $d$, $f$, $h$, $j$, and $l$ the A.-C. voltage of the incoming part of the pulse is 180 degrees out of phase with the A.-C. voltage of the outgoing parts of the pulse because these points are an odd number of quarter wavelengths from the open-circuited end of the line. Therefore, at these points along the line the voltages cancel where they overlap. At points along the line between the selected points $a$ through $m$, the algebraic sum of the overlapping parts depends on the amount of phase difference between the A.-C. voltage of the parts.

Fig. 7 is a representation of the values of time-integrated A.-C. voltage at all points along the line. The points, $a'$, $b'$, $c'$, $d'$, $e'$, $f'$, $g'$, $h'$, $i'$, $j'$, $k'$, $l'$ and $m'$ are above the base line by a distance equal to the area under each of the corresponding curves shown in Fig. 6. The curve in Fig. 7 is continuous, showing the time-integrated voltage at all points along the line and not at merely the selected points $a$ through $m$.

Figs. 5, 6 and 7 indicate conditions on a line having its remote end open-circuited. A line having its remote end short circuited can just as well be used, the difference being merely that the voltage nodes will be where voltage maximums are shown in Fig. 7, and vice versa.

Note in Fig. 6 that the area under curve $b$ is equal to the area under curve $m$ since curve $b$ has twice the width of the pulse and curve $m$ has twice the amplitude of the pulse. Note also that point $b$ on the line is a point where the A.-C. voltage of the incoming part of the pulse is 180 degrees out of phase with the A.-C. voltage of the outgoing part of the pulse, so that if the incoming and outgoing parts overlapped, there would be some cancellation of voltage. Note further in Fig. 3 that point $b$ is where the leading edge and the trailing edge of the pulse coincide in position for an instant during which half of the pulse is moving into the line and the other half is moving out of the line. Therefore, it can be concluded that the distance along the line from open-circuited end $m$ to point $b$ (which is a multiple of odd quarter wavelengths from the open-circuited end) is a measure of the width of the pulse. The actual pulse width (or length) can be determined by multiplying the distance by two. The actual pulse duration can be determined by multiplying the distance by two and dividing by the speed of transmission of energy along the line.

Referring now to Fig. 8 for an explanation of an exemplary pulse-width measuring process within the scope of this invention:

The source 1 of the radio-frequency pulse to be measured is connected to slotted section of line 2. This equipment is used for frequencies in the order of 1000 megacycles. The impedance at all connecting points must be such that none of the energy of the pulse is reflected from the connections. Slotted line 2 has slot 3 and has remote end 4 terminated with an open circuit. End 4 is provided with any suitable mechanical means of the type well known in the art (not shown in the drawing) for coupling an additional section of coaxial line 30 having its remote end 31 terminated with an open circuit as end 4 was terminated before addition of section 30. Likewise section 32 and any necessary number of other sections (not shown) may be added in order to make the line be of any desired length and be terminated at its remote end in an open circuit.

Extending into slotted line 2 through slot 3 is pick-up probe 5. The slotted line probe assembly 9 is moveable back and forth along slot 3 and it comprises: cylindrical outer conductor 10, quarter-wave stub 6, probe 5, integrating element 7 which may be a $\frac{1}{200}$-ampere fuse, R.-F. by-pass condenser 8 which may have a value of 1000 micro-micro-farads, and output lead 11 which is the inner conductor of a coaxial cable 11'. Output lead 11 connects through primary 12 of input transformer of video amplifier 20, through lead 13 to source of direct current 15 connected to ground and by-passed by condenser 14. The direct current flows from ground through source 15, wire 13, primary coil 12, wire 11, integrating element 7, and quarter-wave stub 6 back to ground. The voltage from source 15 is adjusted so that a direct current of about 5 milli-amperes flows.

Integrating element 7 is known to those skilled in the art as a bolometer. In operation, element 7 changes its resistance depending upon the amount of R.-F. energy conducted to it from probe 5. The direct current flowing through element 7 varies in accordance with the resistance of element 7, and the variation of direct current is applied to the input of video amplifier 20. In the example where the repetition rate of the pulses is between 60 and 1000 pulses per second, bolometer 7 which consists of $\frac{1}{200}$ amp. fuse wire, will be fast acting relative to the repetition rate of the pulses but slow acting relative to the sudden changes in the envelope of the resultant radio frequency pulse at the point of the line in question shown in Figure 6, so that for each pulse sent down the line a pulse 27 will appear in the input to video amplifier 20. Since the change in bolometer resistance is proportional to the energy in the pulse present at the point of the line in question, the amount of the change in direct current in the bolometer circuit produced thereby is a measure of the energy of the pulse. The direct current flowing through transformer winding 12 changes at the beginning and end of the pulse of energy produced in pulse source 1 and thus provides a pulse 27 in the output of video amplifier 20. The amplitude of the pulse viewed on synchroscope 25 will therefore be proportional to the time integral of the resultant radio frequency energy pulse at the point of the line 2 being observed.

Although a bolometer 7 has been shown as the integrating element because of its high sensitivity, other well known integration circuits may be substituted therefor if sufficient power is present in the pulse of energy to be integrated. The specific integrating circuit used therefor forms no part of the present invention.

The output of amplifier 20 is fed through lead 24 to synchroscope 25 where indication 27 is made to appear on indicator screen 26. A synchroscope is similar to an oscilloscope except that it usually has a faster sweep and has provisions so that the sweep can be started by the pulse to be observed. Indication 27 does not itself show the shape of the pulse. The amplitude of indication 27 is an indication of the time-integrated voltage in the line.

It should be understood that synchroscope 25 is conventional and well known and need be used only when the pulses from source 1 occur at a random rate since the synchroscope beam sweep is not free running but is initiated by the signal to be viewed. A conventional oscilloscope having a fast free running sweep could obviously be substituted for synchroscope 25 if the pulse repetition rate of the pulses to be viewed is constant.

The oscilloscope or synchroscope is one convenient way to view the amplitude variation of the pulse whose amplitude is a measure of the integrated voltage. Any conventional and well known peak voltage measuring instrument could obviously be substituted therefor.

All of the equipments described are well known to those skilled in the art.

To determine the width of the pulse from a pulse source 1, the pulse is fed into slotted line 2 which is initially terminated in an open circuit. (It is to be understood that a short-circuit termination could be employed if desired.) Probe 5 is then positioned in the slot close to the open-circuited end 4 or at a multiple of ½ wave length from the open-circuited end. Adjustments are then made of source 1, probe 5, amplifier 20, and synchroscope 25 to get a minimum of loading on the line by the probe and a good indication on the synchroscope. Then when the probe assembly is moved back and forth on the slotted line, the amplitude of pulse 27 will be seen to vary from its initial maximum depending on the position of the probe along the line.

To determine the pulse width, sections of line are added until the probe can be moved back and forth a distance of ½ wavelength without the indication 27 varying from its maximum value. The least distance from the remote end of the line to the probe when the said constant maximum indication is observed is a measure of the pulse width. The said distance in meters is multiplied by two and divided by the speed of transmission of energy along the line (300 meters per microsecond for practical purposes) to get the width of the pulse in micro-seconds.

Referring now to Fig. 9 for an explanation of an exemplary pulse-shape-determining process within the scope of this invention:

Fig. 9 differs from Fig. 8 in that it shows variable attenuator 40 interposed between pulse source 1 and slotted line 2. Attenuator 40 is connected to source 1 by coaxial cable 39. Variable attenuator 40 is calibrated so that the time-integrated voltage nodes can be measured by decreasing the attenuation so as to keep the amplitude of the indication constant. In this way errors due to non-linearity in the equipments are avoided.

Fig. 9 also differs from Fig. 8 in that the line is shown terminated in a short circuit.

To determine approximate pulse shape, measurements are taken of time-integrated voltage nodes at points along the line corresponding to points $b'$, $d'$, $f'$, $h'$, $j'$ and $l'$ of Fig. 7. The node values determined are divided into the maximum value and the quotients plotted on the comparison chart of Fig. 10. The shape of the pulse can be approximately determined by interpolating between the curves shown on Fig. 10 representing a square pulse, a triangular pulse, and a sharp pulse having sides formed by striking arcs having radius equal to the height and equal to ½ the base width. Comparison with curves of Fig. 10 will not, however, indicate whether the peak of the pulse is at the center of the base or at one side.

The ratios of attenuator readings in decibels are converted to ratios of time-integrated voltage for plotting on the chart of Fig. 10 by the following formula:

$$\text{Time-integrated voltage ratio} = \text{antilog} \frac{\text{decibel reading}}{20}$$

If the chart of Fig. 10 had been plotted in time-integrated power ratios, the following formula would have been used.

$$\text{Time-integrated power ratio} = \text{antilog} \frac{\text{decibel reading}}{10}$$

The chart of Fig. 10 may be determined graphically. Curve 1 is a plot on log graph paper of the ratios of maximum time-integrated voltages vs. the position of the nodes along the line in terms of pulse width. Curve 1 applies to square pulses and can be plotted from the values of $b'$, $d'$, $f'$, $h'$, $j'$, and $l'$ of Fig. 7 which in turn are determined from the area under the corresponding charts of Fig. 6. Curve 2 represents a triangular pulse. Curve 3 represents a sharp pulse having sides with radius equal to the height and to ½ the base dimension. Curves 2 and 3 may be determined graphically in the same manner as curve 1.

The plot of all pulse shapes can be expected to fall between curves 1 and 3. Curves representing other shapes could be plotted graphically in order to more definitely determine by comparison the shape of a pulse to be tested.

It will be understood that the processes described are exemplary of the invention and that the scope thereof will be ascertained with reference to appended claims.

The invention described herein may be manufactured and used by or for the Government of the United States of America for governmental purposes without the payment of any royalties thereon or therefor.

What is claimed is:

1. A method of obtaining a measure of the width of a recurrent pulse of energy of a given frequency with a transmission means having an electrical length over one-half the width of said pulse of energy and terminated so as to reflect said energy comprising the steps of feeding said pulse of energy into said transmission means, locating from among the series of contiguous points along said transmission means over which the time integral of power flowing through said transmission means does not vary the point nearest the terminated end thereof, translating the length of transmission means between said point and the terminated end of said transmission means, into a measurement of the duration of said energy pulse.

2. A method of obtaining a measure of the width of a given recurrent pulse of radio frequency energy comprising feeding said pulse of energy into a pulse transmission means which is terminated so as to reflect said energy pulse, indicating the time integral of power of said pulse over a preselected space interval along said transmission means, varying the distance of said interval from the terminated end of said transmission means until the indication of the time integral of power remains substantially constant over at least a portion of said interval, locating the point in said portion nearest said terminated end, and translating the length of transmission means between the terminated end thereof and said located point into a measurement of the width of said energy pulse.

3. The method of obtaining a measure of the width of a recurrent pulse of energy of a given frequency comprising the steps of feeding said recurrent pulse into an energy transmission means having an electrical length over one-half the width of said pulse and its remote end terminated so as to reflect said energy, indicating the time-integral of power flowing through said transmission means at a given point therealong, moving said point of indication along said transmission means relative to said terminated end until a point of indication is located from which further movement of said point away from said terminated end produces no variation and toward said terminated end results in variation in the time-integral of power indications along said transmission means; and translating the distance from the located point to said terminated end into a measure of the width of said energy pulse.

4. In the method of obtaining a measure of the width of a recurrent pulse of energy of a given frequency, the steps of feeding said recurrent pulse into an energy transmission means having an electrical length over one-half the width of said pulse and its remote end terminated so as to reflect said energy, indicating the time-integral of power flowing through said transmission means at a given point therealong, and moving said point of indication along said transmission means relative to said terminated end until a point of indication is located from which further movement of said point away from said terminated end produces no variation and toward said terminated end results in variation in the time-integral of power indications along said transmission means.

5. In the method of obtaining a measure of the width of a recurrent pulse of energy of a given frequency with a transmission means having an electrical length over one-half the width of said pulse of energy and terminated so as to reflect said energy, the steps of feeding said pulse of energy into said transmission means, and locating from among the series of contiguous points along said transmission means over which the time-integral of power flowing through said transmission means does not vary the point nearest the terminated end thereof.

References Cited in the file of this patent

UNITED STATES PATENTS

| | | |
|---|---|---|
| 2,188,970 | Wilson | Feb. 6, 1940 |
| 2,191,271 | Carter | Feb. 20, 1940 |
| 2,266,154 | Blumlein | Dec. 16, 1941 |
| 2,404,797 | Hansen | July 30, 1946 |
| 2,411,547 | Labin et al. | Nov. 26, 1946 |
| 2,454,042 | Dettinger | Nov. 16, 1948 |
| 2,477,347 | Posey | July 26, 1949 |
| 2,488,378 | Coltman | Nov. 15, 1949 |